Oct. 16, 1945.

A. PROCTER 2,387,182

HYDRAULIC PACKING WASHER

Filed Jan. 11, 1944

Inventor
ANTHONY PROCTER.
By His Attorney.
Francis E. Boyce

UNITED STATES PATENT OFFICE 2,387,182

HYDRAULIC PACKING WASHER

Anthony Procter, Newcastle-upon-Tyne, England

Application January 11, 1944, Serial No. 517,785
In Great Britain December 28, 1942

3 Claims. (Cl. 286—7)

This invention relates to hydraulic packing washers, usually of U cross section, presenting sealing lips more or less oppositely pressed by the fluid pressure respectively each against a different one of a pair of relatively rotating machine parts, one of which usually is stationary and wherein the packing washer is mounted in a recess.

Hitherto packing washers of the above kind are held stationary relatively to one of the relatively rotating machine parts, normally the stationary machine part, so that abrasion due to rubbing contact is concentrated solely upon the sealing lip which bears against the other relatively rotating machine part, normally the rotating machine part.

The object of the present invention is to distribute the wear on both sealing lips of hydraulic packing washers having more or less oppositely fluid pressed sealing lips bearing respectively each against a different one of a pair of relatively rotating machine parts, and thus, in reducing the wear on one sealing lip, to increase the useful life of the entire washer.

To the above end, according to the invention, a hydraulic packing washer, usually of U cross section, having a pair of sealing lips located to be oppositely laterally pressed by fluid pressure, is rotatable relatively to a support whereon it can be mounted between two relatively rotating machine parts.

The support relatively to which the packing washer is rotatable may be one member of a bearing, the washer being mounted on, and preferably secured to, the other member of the bearing.

As a U packing washer is usually located in a situation where lubrication of an ordinary plain bearing, consisting for instance of a pair of annular discs or concentrically interfitted narrow sleeves, would be difficult, the bearing preferably is a ball or roller anti-friction bearing. The washer is applied to one race of the bearing, which conveniently is a ball bearing, as such bearings are conveniently narrow, and the other race of the bearing is mounted in the recess in the respective, usually stationary, machine part. In order that the rotary race of the ball bearing and the base of the U washer shall not rub against the wall of the recess, or against the moving machine part, the surface of the stationary race directed towards the wall of the recess or towards the moving machine part, such as a shaft, projects slightly, or a suitable thin distance piece is interposed against the wall or shaft.

Representative examples of rotatably mounted U washers are illustrated on the accompanying drawing, in which.

Figure 1:
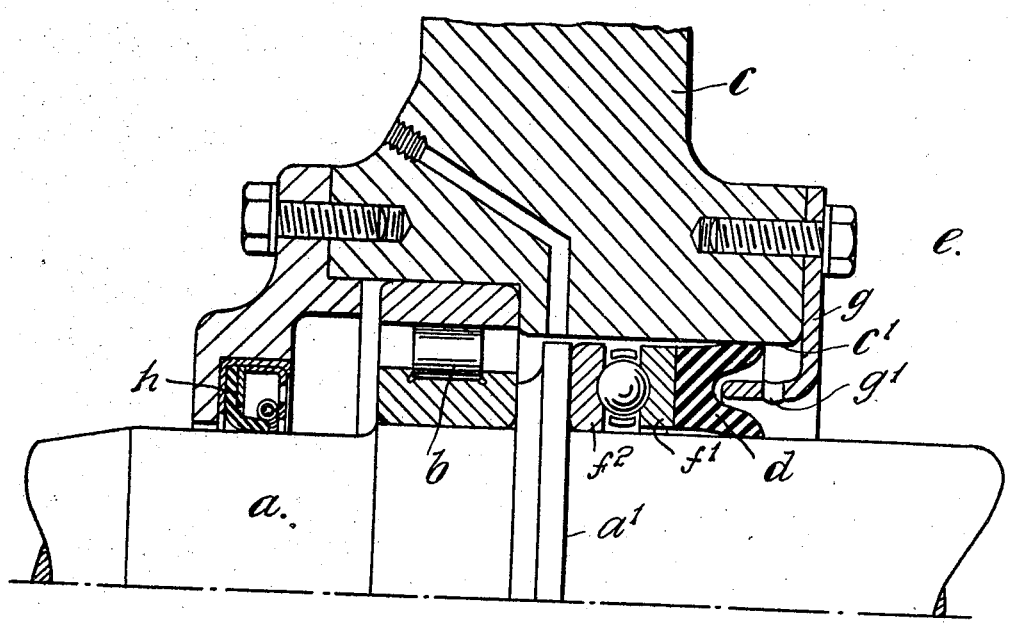
Fig. 1 is a half axial section through a shaft bearing assembly, showing an axially directed U washer rotatably mounted on a ball bearing, in the housing of the shaft bearing.

Referring to Fig. 1, $a$ is a shaft rotatably mounted on a roller bearing $b$, in a bearing aperture $c^1$ of a housing $c$.

$d$ is a U washer of rubber, usually oil-resistant synthetic rubber, having sealing lips axially directed towards a space $e$, assumed to contain a fluid under pressure. The base of the U washer $d$ is applied against, and may be cemented, vulcanised or otherwise secured to, one race member $f^1$ of a ball thrust bearing, the other race member $f^2$ of which bears against a collar $a^1$ of the shaft $a$, under the effect of the fluid pressure in the space $e$.

The inner and outer diameters of the ball bearing race member $f^1$ are such that when the ball bearing is mounted concentrically with the shaft $a$, such member $f^1$ is clear of contact both with the shaft $a$ and with the wall of the aperture $c^1$ of the housing $c$, as is likewise the base of the U washer $d$. This is ensured by the inner diameter of the other ball bearing race member $f^2$ being smaller than that of the member $f^1$, so that the member $f^2$ projects radially inwardly beyond the member $f^1$. Thus although the member $f^2$ rotates with and therefore at the same speed as the shaft $a$, the member $f^1$ and the U washer $d$ are free to float and rotate at a lesser speed. Wear will therefore be distributed between both lips of the U washer $d$ as both will rotate relatively to the shaft $a$ and wall of the aperture $c^1$ respectively.

$g$ is a metal washer with an axially directed flange which serves to prevent the U washer $d$ coming out of its place in the aperture $c^1$ when fluid pressure is relaxed in the space $e$. Apertures $g^1$ are provided in the axially directed flange of the retaining washer $g$, to allow fluid pressure to act equally on both lips of the U washer $d$.

$h$ is an oil seal of ordinary construction to retain oil in, and prevent the entry of dirt into, the main bearing $b$.

Figure 2:
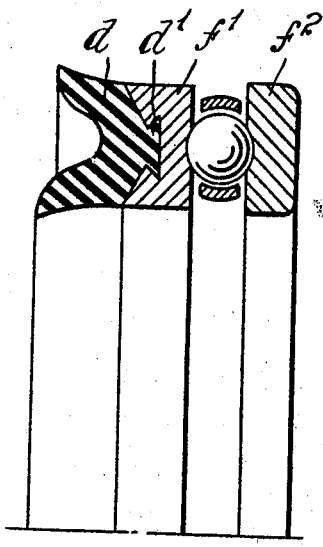
Fig. 2 is a half axial section of a modified construction of an axially directed U washer mounted on a ball bearing.

Instead of the ball bearing race member $f^2$ projecting inwardly beyond the ball bearing race member $f^1$, both may have the same diameters as shown in Fig. 2. In such case a liner may be interposed between the member $f^2$ and, as a sleeve on, the shaft $a$, to space the member $f^1$ and the base of the U washer $d$ concentrically clear of the shaft $a$.

Fig. 2 also shows the U washer $d$ keyed to the ball bearing race member $f^1$ by a dovetail rib $d^1$ on its base, moulded in a dovetail undercut groove in the face of the ball bearing race member $f^1$. The inner lip of the U washer $d$ also is longer than the outer lip, in order to equalise approximately the areas of surface contact of both lips, by thereby compensating for the difference in surface areas due to difference in diameters.

Figure 3:
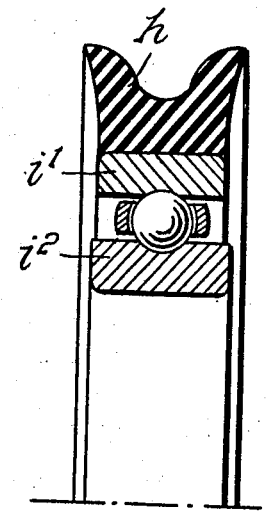
Fig. 3 is a half axial section of a radially outwardly directed U washer mounted on a ball bearing.
Figure 4:
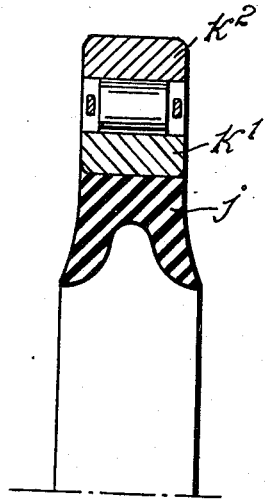
Fig. 4 is a half axial section of a radially inwardly directed U washer mounted on a roller bearing.

Fig. 3 shows a U washer $h$ with radially outwardly directed lips assumed to wipe radial surfaces and mounted on the outer race member $i^1$ of a cylindrical ball bearing, the inner member $i^2$ of which projects beyond the member $i^1$. Inversely, a U washer $j$ with inwardly directed lips can be mounted on the inner member $k^1$ of a bearing as shown in Fig. 4, which in this example is a cylindrical roller bearing, the outer member $k^2$ of which does not project beyond the member $k^1$.

The U washer may be supplied detached from the ball or roller bearing and be mounted thereagainst or thereon when the two components are assembled between the two machine parts. Preferably however to ensure mutual suitability, and for convenience, the U washer is supplied already secured against or on or in the ball or roller bearing, by cementing, bonding, mechanical interlock or otherwise, all as a complete unit.

I claim:

1. In a shaft housing, a U packing washer having lips oppositely laterally pressed by fluid pressure against surfaces of said shaft and housing, a freely rotatable annulus against which the base of said U washer bears, and a second annulus supported against displacement in said shaft bearing housing and supporting said first annulus against displacement.

2. In a shaft housing, a U packing washer having lips oppositely laterally pressed by fluid pressure against surfaces of said shaft and housing, a freely rotatable annulus against which the base of said U washer bears, a second annulus supported against displacement in said shaft bearing housing, and anti-friction means interposed between said annuli.

3. In a shaft housing, a U packing washer having lips oppositely laterally pressed by fluid pressure against surfaces of said shaft and housing, a freely rotatable annulus against which the base of said U washer bears, a second annulus supported against displacement in said shaft bearing housing, and anti-friction balls interposed between said annuli.

ANTHONY PROCTER.